US009745487B2

(12) United States Patent
Wang et al.

(10) Patent No.: US 9,745,487 B2
(45) Date of Patent: Aug. 29, 2017

(54) YELLOW THERMOCHROMIC DYES, INKS COMPOSITION AND LEVEL INDICATORS

(71) Applicant: Chromatic Technologies, Inc., Colorado Springs, CO (US)

(72) Inventors: Ruizheng Wang, Colorado Springs, CO (US); Yu Du, Colorado Springs, CO (US); Timothy J. Owen, Colorado Springs, CO (US); Medhanei Abraha, Colorado Springs, CO (US); Terrill Scott Clayton, Colorado Springs, CO (US); Lyle Small, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

(21) Appl. No.: 15/218,770

(22) Filed: Jul. 25, 2016

(65) Prior Publication Data
US 2016/0333210 A1    Nov. 17, 2016

Related U.S. Application Data

(63) Continuation of application No. 14/322,073, filed on Jul. 2, 2014, now Pat. No. 9,399,716.
(Continued)

(51) Int. Cl.
| | | |
|---|---|---|
| *B41M 5/28* | (2006.01) | |
| *B41M 5/327* | (2006.01) | |
| *C09D 11/50* | (2014.01) | |
| *C08K 5/3445* | (2006.01) | |
| *B41M 5/333* | (2006.01) | |
| *C08K 5/053* | (2006.01) | |
| *C08K 5/09* | (2006.01) | |
| *C09D 11/00* | (2014.01) | |
| *C09B 11/08* | (2006.01) | |
| *C09B 11/22* | (2006.01) | |

(Continued)

(52) U.S. Cl.
CPC ............. *C09D 11/50* (2013.01); *B41M 5/287* (2013.01); *B41M 5/327* (2013.01); *B41M 5/3335* (2013.01); *C08K 5/053* (2013.01); *C08K 5/09* (2013.01); *C08K 5/3445* (2013.01); *C09B 11/08* (2013.01); *C09B 11/22* (2013.01); *C09B 11/26* (2013.01); *C09B 57/00* (2013.01); *C09B 57/008* (2013.01); *C09D 11/00* (2013.01)

(58) Field of Classification Search
CPC ........ B41M 5/28; B41M 5/287; B41M 5/327; C09D 11/50; C08K 5/3445
USPC ........ 106/31.18, 31.19, 31.21; 503/209, 214, 503/215, 220
See application file for complete search history.

(56) References Cited

U.S. PATENT DOCUMENTS

| | | |
|---|---|---|
| 3,617,335 A | 11/1971 | Kimura et al. |
| 3,985,376 A | 10/1976 | Baumann et al. |

(Continued)

FOREIGN PATENT DOCUMENTS

| | | |
|---|---|---|
| GB | 1264636 | 2/1972 |
| JP | 2003186242 | 7/2003 |

OTHER PUBLICATIONS

U.S. Appl. No. 14/322,073, filed Jul. 2, 2014.
(Continued)

*Primary Examiner* — Bruce H Hess
(74) *Attorney, Agent, or Firm* — Craig R. Miles; CR Miles P.C.

(57) ABSTRACT

A new leuco dye produces a yellow color while demonstrating also exceptional light and thermal stability under light.

20 Claims, 1 Drawing Sheet

Related U.S. Application Data

(60) Provisional application No. 61/847,120, filed on Jul. 17, 2013, provisional application No. 61/842,165, filed on Jul. 2, 2013.

(51) Int. Cl.
  *C09B 11/26* (2006.01)
  *C09B 57/00* (2006.01)

(56) References Cited

U.S. PATENT DOCUMENTS

| | | | |
|---|---|---|---|
| 4,039,557 A | 8/1977 | Gamer et al. |
| 4,363,503 A | 12/1982 | Schmidt et al. |
| 4,421,560 A | 12/1983 | Kito et al. |
| 4,425,161 A | 1/1984 | Shibahashi et al. |
| 4,480,096 A | 10/1984 | Fletcher |
| 4,720,301 A | 1/1988 | Kito et al. |
| 5,013,707 A | 5/1991 | Phaff et al. |
| 5,219,625 A | 6/1993 | Matsunami |
| 5,240,897 A | 8/1993 | Braun et al. |
| 5,558,700 A | 9/1996 | Shibahashi et al. |
| 5,591,255 A | 1/1997 | Small et al. |
| 5,997,849 A | 12/1999 | Small et al. |
| 6,015,907 A | 1/2000 | Marshall |
| 6,139,779 A | 10/2000 | Small et al. |
| 6,494,950 B1 | 12/2002 | Fujita et al. |
| 7,351,362 B2 | 4/2008 | Yasuda |
| 7,494,537 B2 | 2/2009 | Ono et al. |
| 8,222,183 B2 | 7/2012 | Ono |
| 8,569,208 B1 | 10/2013 | Ribi |
| 2003/0087757 A1 | 5/2003 | Kubota et al. |
| 2003/0089270 A1 | 5/2003 | Shen et al. |

OTHER PUBLICATIONS

U.S. Appl. No. 61/847,120, filed Jul. 17, 2013.
U.S. Appl. No. 61/842,165, filed Jul. 2, 2013.
PCT/US2014/045224, International Search Report and Written Opinion dated Oct. 20, 2014, 8 pages.

YELLOW THERMOCHROMIC DYES, INKS COMPOSITION AND LEVEL INDICATORS

RELATED APPLICATIONS

This United States Patent Application is a continuation of U.S. patent application Ser. No. 14/322,073, filed Jul. 2, 2014, which claims the benefit of U.S. Provisional Patent Application No. 61/847,120, filed Jul. 17, 2013, and U.S. Provisional Patent Application No. 61/842,165, filed Jul. 2, 2013, each hereby incorporated by reference herein.

BACKGROUND

Field of the Invention

Leuco Dyes

Dyes that change color over a range of temperatures are known as thermochromic dyes. Most commonly used thermochromic dyes as color formers in thermochromic systems generally include, but are not limited to, spirolactones, fluorans, spiropyrans, and fulgides. More specifically; thermochromic dyes are based on diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-rhodamine lactone derivatives. These include: 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino) fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N-ethyl-N-isobutylamino)fluoran, 1,2-benzo-6-(N-ethyl-N-isoamylamino)fluoran; 2-(3-methoxy-4-dodecoxystyryl) quinoline; spiro[5H-(1)benzopyrano(2,3-d)pyrimidine-5,1'(3'H)isobenzofuran]-3'-one; 2-(diethylamino)-8-(diethylamino)-4-methyl-spiro[5H-(1)benzopyrano(2,3-d) pyrimidine-5,1'(3'H)isobenzofuran]-3'-one; 2-(di-n-butylamino)-8-(di-n-butylamino)-4-methyl-spiro[5H-(1) benzopyrano(2,3-d)pyrimidine-5,1'(3'H)isobenzofuran]-3'-one; 2-(di-n-butylamino)-8-(diethylamino)-4-methyl-spiro [5H-(1)benzopyrano(2,3-d)pyrimidine-5,1'(3'H) isobenzofuran]-3'-one; 2-(di-n-butylamino)-8(N-ethyl-N-isoamylamino)-4-methyl-spiro[5H-(1)benzopyrano(2,3-d) pyrimidine-5,1'(3'H)isobenzofuran]-3'-one; and 2-(di-n-butylamino)-8-(di-n-butylamino)-4-phenyl and trisubstituted pyridines.

For example, fluoran based thermochromic dyes can provide variety of colors when contacted with suitable developers: The following dyes are a few examples of such thermochromic leuco dyes (Table 1).

TABLE 1

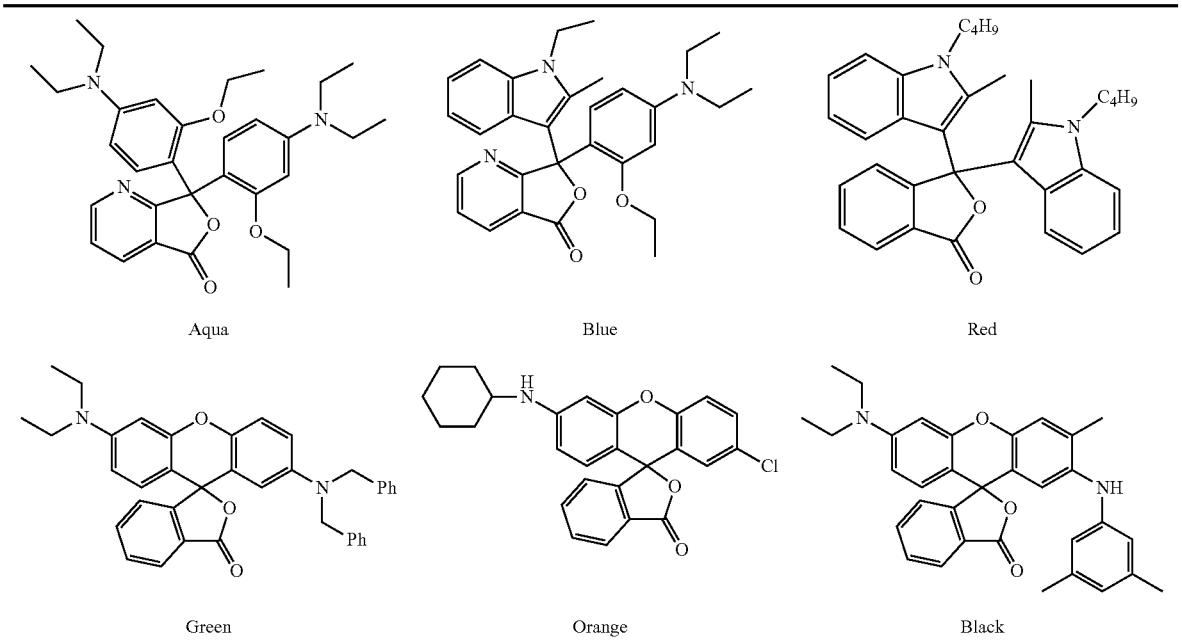

Aqua　　Blue　　Red

Green　　Orange　　Black

Thermochromic dyes can be manufactured to have a color change that is reversible or irreversible. Formulated as inks or dyes, they are used in a variety of applications such as plastic masterbatch, paper, textiles, coatings, offset ink, metal decorating inks and coatings, ultraviolet radiation curable inks and coatings, solvent based inks and coatings, screen inks and coatings, gravure inks and coatings, paints, security printing, brand protection, smart packaging, marketing and novelty printing, among other uses.

Thermochromic dyes are part of an interacting system known as Thermochromic ink. The parts of the ink system are leuco dyes acting as colorants, weak organic acids acting as color developers and solvents that variably interact with components of the system according to the temperature of the system. Thermochromic dye systems are microencapsulated in a protective coating to protect the contents from undesired effects from the environment. Each microcapsule is self-contained, having all of the components of the entire system required to reproduce the color change. The components of the system interact with one another differently at different temperatures. Generally, the system is ordered and colored below a temperature corresponding to the full color point. The system becomes increasingly unordered and starts to lose its color at a temperature corresponding to a predetermined activation temperature.

Below the activation temperature, the system is colored and above the activation temperature they are usually clear or lightly colored. The activation temperature corresponds to a range of temperatures at which the transition is taking place between the full color point and the clearing point. Generally, the activation temperature is defined as the temperature at which the human eye can perceive that the system is starting to lose color, or alternatively, starting to gain color. Presently, thermochromic systems are designed to have activation temperatures over a broad range, from about −20° C. to about 80° C. or more. With heating, the system becomes increasingly unordered and continues to lose its color until it reaches a level of disorder at a temperature corresponding to a clearing point. At the clearing point, the system lacks any recognizable color.

Specific thermochromic ink formulations are known in the art. See, for example, U.S. Pat. Nos. 4,720,301, 5,219,625, 5,558,700, 5,591,255, 5,997,849, 6,139,779, 6,494,950 and 7,494,537, all of which are expressly incorporated herein by reference to the same extent as though fully replicated herein. These thermochromic inks are known to use various components in their formulations, and are generally reversible in their color change. Thermochromic inks are available in various colors, with various activation temperatures, clearing points and full color points. Thermochromic inks may be printed by offset litho, dry offset, letterpress, gravure, flexo and screen processes, amongst others. Thermochromic inks containing leuco dyes are available for all major ink types such as water-based, ultraviolet cured and epoxy. The properties of these inks differ from process inks. For example, most thermochromic inks contain the thermochromic systems as microcapsules, which are not inert and insoluble as are ordinary process pigments. The size of the microcapsules containing the thermochromic systems ranges typically between 3-5 µm which is more than 10-times larger than regular pigment particles found in most inks. The post-print functionality of thermochromic inks can be adversely affected by ultraviolet light, temperatures in excess of 140° C. and aggressive solvents. The lifetime of these inks is sometimes very limited because of the degradation caused by exposure to ultraviolet light from sunshine. Thus, there is a need in the art for thermochromic systems in inks and coatings having resistance to degradation from exposure to ultraviolet light.

Prior art reveals that the color transition range of microencapsulated thermochromic systems may be adjusted by shifting the full color point upward toward the clearing point, or shifting the clearing point downward toward the full color point, as explained in U.S. Pat. No. 6,494,950. These shifts are accomplished by adding high melting point materials to increase the full color point or, alternatively, by adding low melting point materials to the system to decrease the clearing point. Thus, the full color point or clearing point may be lowered or raised, but the overall temperature range between the two points remains unchanged because the amount of separation or width across the hysteresis window is left largely unaffected.

Developers

Weak acids that can be used as color developers act as proton donors, changing the dye molecule between its leuco form and its protonated colored form; stronger acids make the change irreversible. Examples of developers used in the present disclosure include but are not limited to: bisphenol A; bisphenol F; tetrabromobisphenol A; 1'-methylenedi-2-naphthol; 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol; 2-naphthol; 2,2bis(2-hydroxy-5-biphenylyl)propane; 2,2-bis(3-cyclohexyl-4-hydroxy)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene)diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyl)diphenol; alpha,alpha'-bis (4-hydroxyphenyl)-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis(4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl) cyclohexane; 1,3-bis[2-(4-hydroxyphenyl)-2-propyl] benzene; 1-naphthol 2,2'-biphenol; 2,2-bis(2-hydroxy-5-biphenylyl)propane; 2,2-bis(3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene)diphenol 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl)phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; α,α,α-tris(4-hydroxyphenyl)-1-ethyl-4-isopropylbenzene; benzyl 4-hydroxybenzoate; bis(4-hydroxyphenyl)sulfidem; bis(4-hydroxyphenyl)sulfone methyl 4-hydroxybenzoate; resorcinol; tetrabromobisphenol A; derivative salts of salicylic acid such as 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; and 4,4'-di-halo-2,2'-biphenol, wherein the halo is chloro, fluoro, bromo, or iodo. Selected structures of the developers are listed in Table 2 on the following pages:

TABLE 2
Developers for use in leuco dye systems
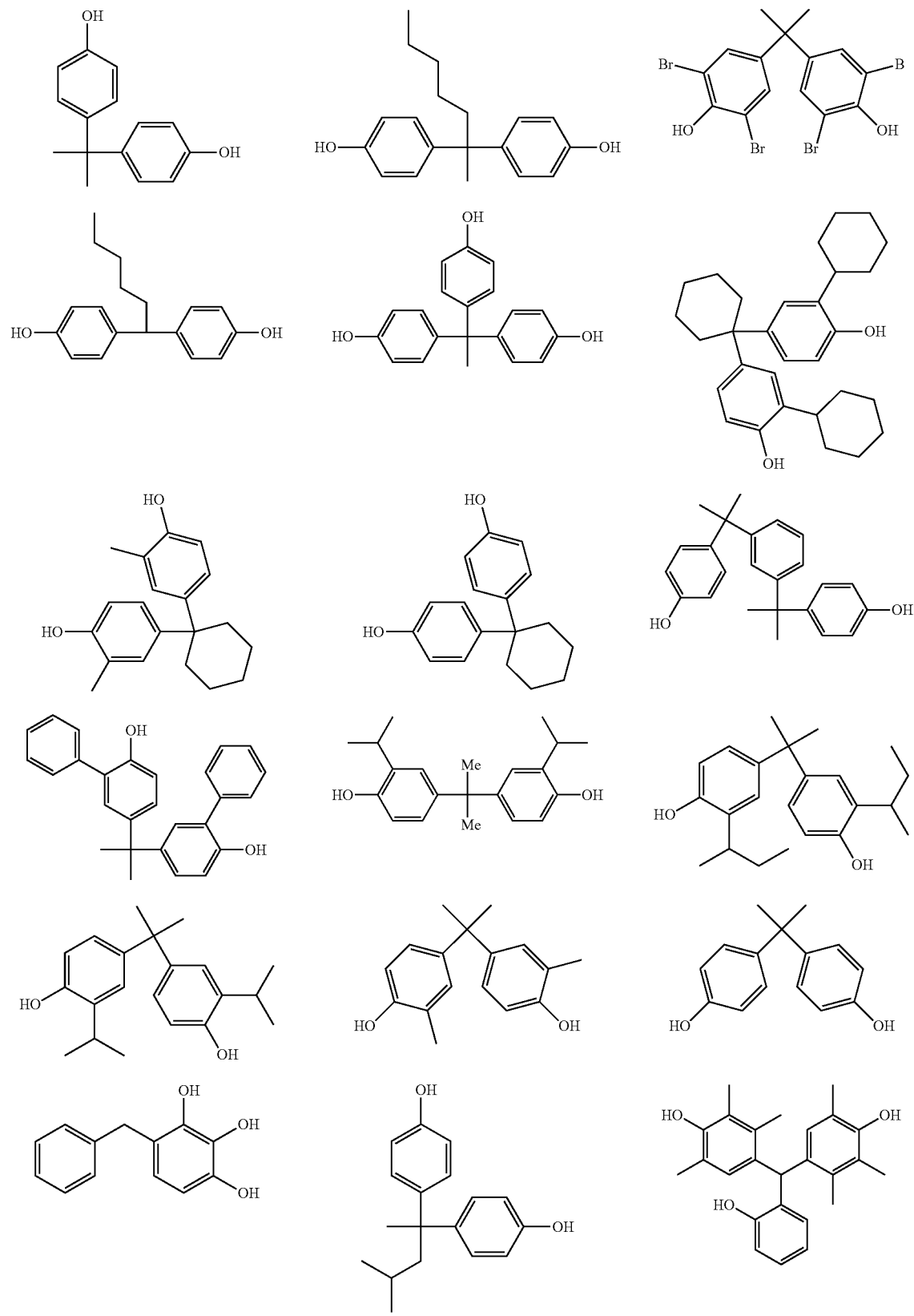

TABLE 2-continued

Developers for use in leuco dye systems

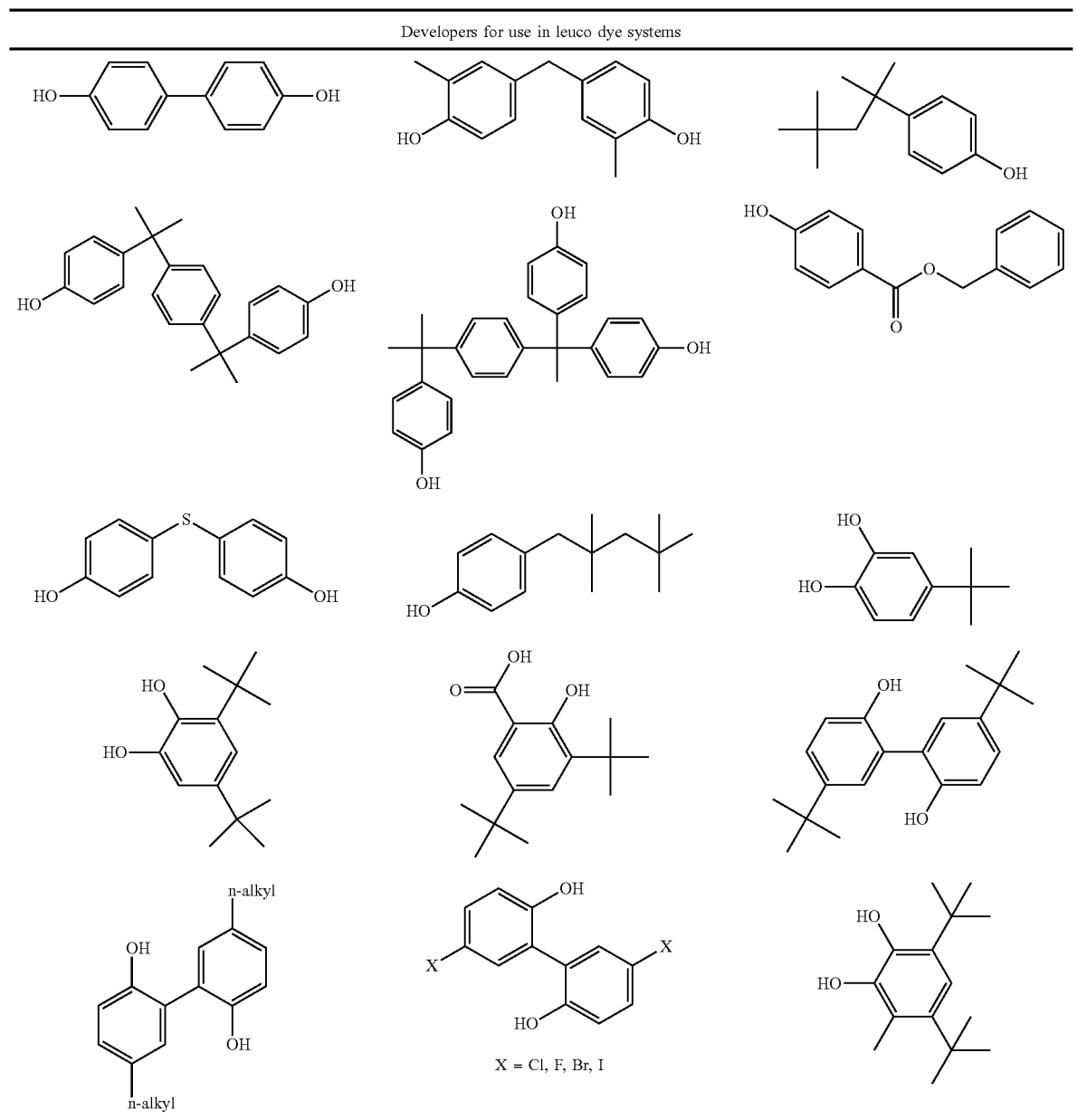

The leuco dyes are combined with leuco dye developers for making thermochromic compositions. These materials are found to generate absorption densities from the leuco dyes when formulated with a carrier that contains one or more fatty ester, fatty alcohol, and fatty amide also known as solvents. The combination of leuco dyes, developers and carrier materials may be used in any combination to achieve the desired functionalities.

Solvents for the Internal Phase

The best solvents to use within the thermochromic system are those that have low reactivity, have a relatively large molecular weight (i.e. over 100), and which are relatively non-polar. U.S. Pat. No. 6,139,779, teaches that it is desirable to minimize the use of certain solvents and other compounds that degrade or destroy the color performance of the dye. In particular, aldehydes, ketones, and diols should be removed from the formulation and replaced with solvents that do not adversely affect the thermochromic pigment. In this regard, solvents having a large molecular weight (i.e. greater than 100) generally are compatible with the thermochromic pigments. The acid content of the formulation may also be adjusted to a value of less than 20 or adjusted to be neutral in the range from 6.5-7.5 pH. These adjustments allow the thermochromic dyes to be added to the formulation without a loss of its color change properties.

Solvents and/or co-solvents used in thermochromic generally may include, but are not limited to: aldehydes, thiols, sulfides, ethers, ketones, esters, alcohols, and acid amides. These solvents can be used alone or in mixtures of 2 or more. Examples of the ethers include, but are not limited to: aliphatic ethers having 10 or more carbon atoms and aromatic ethers. Examples of ketone solvents include, but are not limited to aliphatic ketones having 10 or more carbon atoms and alicyclic ketones. Examples of the ester solvents may be selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms. Examples of the alcohol solvents include, without limitation, monohydric aliphatic saturated alcohols, alicyclic alcohols and aromatic alcohols.

Certain solvents reduce the hysteresis window. The solvent may be material combined with the thermochromic system, for example, to reduce thermal separation across the hysteresis window to a level demonstrating 80%, 70%, 50%, 40%, 30% or less of the thermal separation that would exist if the co-solvent were not present. The co-solvent can be selected from the group consisting of derivatives of mysristic acid, derivatives of behenyl acid, derivatives of palmytic acid and combinations thereof. Generally, these materials include myristates, palmitates, behenates, together with myristyl, stearyl, and behenyl materials and certain alcohols. In one aspect, these materials are preferably solvents and co-solvents from the group including isopropyl myristate, isopropyl palmitate, methyl palmitate, methyl stearate, myristyl myristate, cetyl alcohol, stearyl alcohol, behenyl alcohol, stearyl behenate, and stearamide. These co-solvents are added to the encapsulated thermochromic system in an amount that, for example, ranges from 9% to 18% by weight of the thermochromic system as encapsulated, i.e., excluding the weight of the capsule. This range is more preferably from about 12% to about 15% by weight.

Stabilizers

In other instances, additives used to fortify the encapsulated thermochromic systems by imparting a resistance to degradation by ultraviolet light by have a dual functionality of also reducing the width of separation over the hysteresis window. Light stabilizers are additives which prevent degradation of a product due to exposure to ultraviolet radiation. These compounds may include blocked phenols, singlet oxygen quenchers, UVA/B absorbers, borotriazoles, and hindered amino light stabilizers (HALS). Specific examples of light stabilizers used in thermochromic systems of the present disclosure and which may also influence the hysteresis window include but are not limited to: avobenzone, bisdisulizole disodium, diethylaminohydroxybenzoyl hexyl benzoate, Ecamsule, methyl anthranilate, 4-aminobenzoic acid, Cinoxate, ethylhexyl triazone, homosalate, 4-methylbenzylidene camphor, octyl methoxycinnamate, octyl salicylate, Padimate O, phenylbenzimidazole sulfonic acid, polysilicone-15, trolamine salicylate, bemotrizinol, benzophenones 1-12, dioxybenzone, drometrizole trisiloxane, iscotrizinol, octocrylene, tetrakis-(methylene-(3,5-di-(tert)-butyl-4-hydrocinnamate)) methane, oxybenzone, sulisobenzone, bisoctrizole, titanium dioxide, zinc oxide, and sterically hindered phenols such as pentaerythritol tetrakis(3-(3,5-di-tert-butyl-4-hydroxyphenyl) propionate sold as Irganox 1010® by Ciba Specialty Chemicals Inc. of Tarrytown N.Y.

Metal Deco Applications

In recent years, metal decoration inks have been adapted for use or thermochromic pigments in high speed commercial canning operations. Most metal beverage cans made in the United States are manufactured from aluminum. In Europe and Asia, approximately 55 percent of cans are made of steel and 45 percent are aluminum alloy. Aluminum cans may contain an internal coating to protect the aluminum from beverage corrosion. Chemical compounds used in the internal coating of the can include types of epoxy resin.

Beverage cans are usually filled before the top is crimped in place. The filling and sealing operations are fast and precise. The filling head centers over the can and discharges the beverage to flow down the sides of the can. The lid is placed on the can then crimped in two operations. A seaming head engages the lid from above while a seaming roller to the side curls the edge of the lid around the edge of the can body. The head and roller spin the can in a complete circle to seal all the way around. A pressure roller next drives the two edges together under pressure to make a gas-tight seal. Filled cans usually have pressurized gas inside, which stiffens the filled cans for subsequent handling.

Aluminum cans may be produced through a mechanical cold forming process starting with punching a flat blank from very stiff cold-rolled sheet. This sheet is often made of a material called alloy 3104-H19 or 3004-H19. This material is aluminum with about 1% manganese and 1% magnesium for strength and formability. A flat blank is first formed into a cup about three inches in diameter. This cup is then pushed through a forming process called "ironing" which forms the can. The bottom of the can is also shaped at this time. The malleable metal deforms into the shape of an open-top can.

The coating may be roller-coated onto coil stock aluminum or aluminum cans. These components may be selected from the group consisting of beverage can ends, beverage can tabs, bottle caps, and/or beverage container closures. The aluminum is preferably an alloy that is commonly used in canning operations, such as aluminum alloy 5182-H48. The coating process preferably occurs in one or more coats to yield a dried film with a thickness ranging from 1 mg/in$^2$ up to 5.5 mg/in$^2$.

Exterior surfaces of the cans may be coated with inks as shown, by way of example, in U.S. Pat. No. 6,494,950. Polyester resins are often favored for use on the sides of the cans. Epoxy resins are favored for use on the lids, especially where there is a need for improved durability of the coatings. Thermochromic inks may be used as indicators to assess when beverages have reached a particular temperature, such as when a soft drink or a beer is at a temperature that is particularly pleasing to the palate. A variety of polyester-based thermochromic inks are commercially available for coating the sides of the cans. Practically speaking, epoxy-based thermochromic inks are not widely available.

In one embodiment, a thermochromic metal decoration ink formulation includes:

| Ingredient | Weight Percent of Coating |
|---|---|
| Pigment* | 1% to 40% |
| Light Stabilizer | 1% to 5% |
| Vehicle | |
| Polymerizable resin | 5% to 30% |
| Dispersing agent | 0% to 5% |
| Solvent | 0% to 50% |
| Curing agent | 0% to 25% |
| Catalyst | 0% to 5% |

*Assessed by solids content upon complete drying of pigment capsules, but does not need to be dried.

In one example of this, a thermochromic pigment may be formulated to use melamine formaldehyde microcapsules having an average diameter from 700 nm to 3 microns. This makes a very good metal decoration ink for high speed application to a metal can where the line speed of the can coater may be as high as 2000 cans per minute. The use of thermochromic metal decorating ink increasingly becomes a limiting factor at higher productions line speeds. Problems arise in the ink rheology with this particle size that leads to misting as the ink is transferred at very high speed.

Conventional thermochromic systems are prepared by combining a color forming molecule or molecules such as leuco dyes that are capable of extended conjugation by proton gain or electron donation; a color developer or developers that donate a proton or accept an electron; and a single solvent or a blend of co-solvents. The solvent, or blend of co-solvents are chosen based on individual melting point and also the resulting thermochromic temperature range of the system. These formulations form an internal phase that is then microencapsulated by a polymeric shell. The microcapsules are referred to as thermochromic pigment.

Thermochromic dye is often used in a slurry of encapsulated dye in a water base. It happens that the pH of this slurry is most often neutral in a range from 6.5 to 7.5. When thermochromic dye is added to a formulation that has a pH outside this range, the color change properties are often lost. This is an irreversible effect and therefore, it is important to adjust the pH prior to adding the thermochromic dye.

One technique used to produce the thermochromic encapsulated dye is to combine water, dye, oil, with melamine formaldehyde resin and agitate to create a very fine emulsification. Interfacial tensions are such that the oil and dye end up on the inside of a melamine formaldehyde capsule distributed in primarily the water phase. The melamine formaldehyde substance, while very hard and resistant to breakdown at high temperature, is permeable.

The inks are made in such a way that very small capsules are formed with a particle size from 400 nm-1.6 microns. Such inks show considerably less misting and better transfer to metal cans at high production speeds. The small particle size also facilitates the commercial use of thermochromic pigments in systems where larger particle size is problematic. By way of example, printed images may now be provided with finer lines and sharper definition than was previously impossible.

U.S. Pat. Nos. 4,421,560 and 4,425,161, entitled "Thermochromic Materials" both state that thermochromic inks can be made with "conventional additives used to improve conventional printing inks."

Several types of ingredients are traditionally added to ink formulations. The combination of all the ingredients in an ink, other than the pigment, is called the vehicle. The vehicle carries the pigment to the substrate and binds the pigment to the substrate. The correct combination of vehicle ingredients will result in the wetting of an ink. This wetting means that the vehicle forms an absorbed film around the pigment particles. The main ingredient in an ink is the binder. This may be a resin, lacquer or varnish or some other polymer. The binder characteristics vary depending on the type of printing that is being done and the desired final product. The second main ingredient is the colorant itself, for example, as described above. The remaining ingredients are added to enhance the color and printing characteristics of the binder and the colorant. These remaining ingredients may include reducers (solvents), waxes, surfactant, thickeners, driers, and/or UV inhibitors.

Currently there is a strong need in the marketplace to have a yellow thermochromic ink that can be coated on cans that has the following required properties: heat stability, UV stability and fast kinetics. Unfortunately, however, among the three primary thermochromic ink colors, there are not many color formers that give yellow color, at least there does not exist such a yellow thermochromic ink that has all three desired properties list above. The currently commercially available yellow color formers have one or more disadvantages: low color density or thermal instability and therefore cannot survive an ink making process, nor is it light stable.

The prior art reports several classes of yellow thermochromic dyes. Both U.S. Pat. Nos. 3,985,376 and 4,363,503 disclose trisubstituted pyridine compounds as being useful color forming components for pressure sensitive recording materials. More recently, specific trisubstituted pyridine compounds have been described in U.S. Pat. No. 6,015,907, as useful for forming yellow images in an imaging medium comprising an acid generator composition capable of producing an acid upon exposure to actinic radiation. The most popular and commercially available yellow thermochromic dye from this class is called Copikem 37 from Hilton-Davis below:

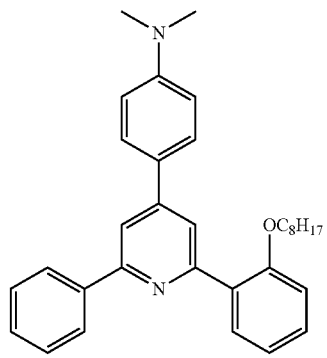

However, this dye fails to provide the desired properties as yellow metal decorating ink as described above. Significant amounts of time and effort have been devoted to further improving this triarylpyridine-based dye class. Table 3 shown on the following page lists dyes that have been synthesized and tested as yellow metal decorating inks:

TABLE 3

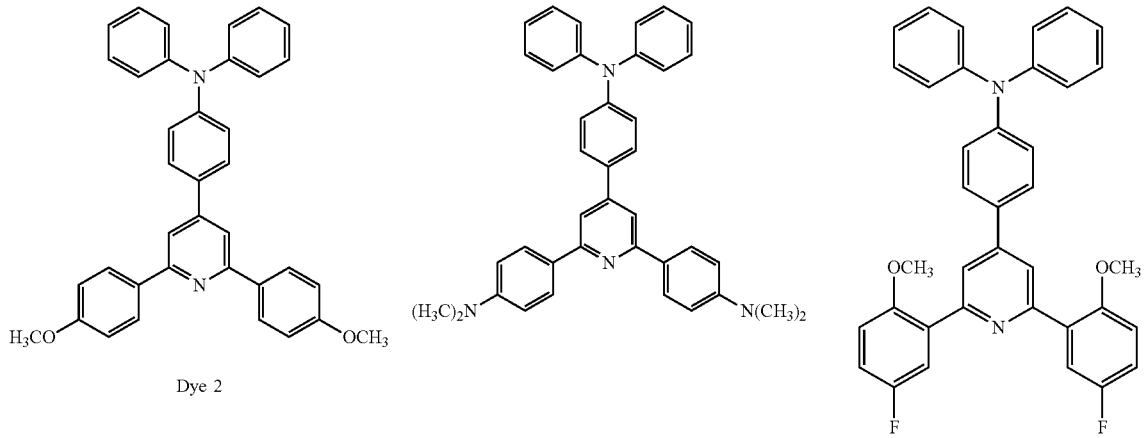

Dye 2

TABLE 3-continued

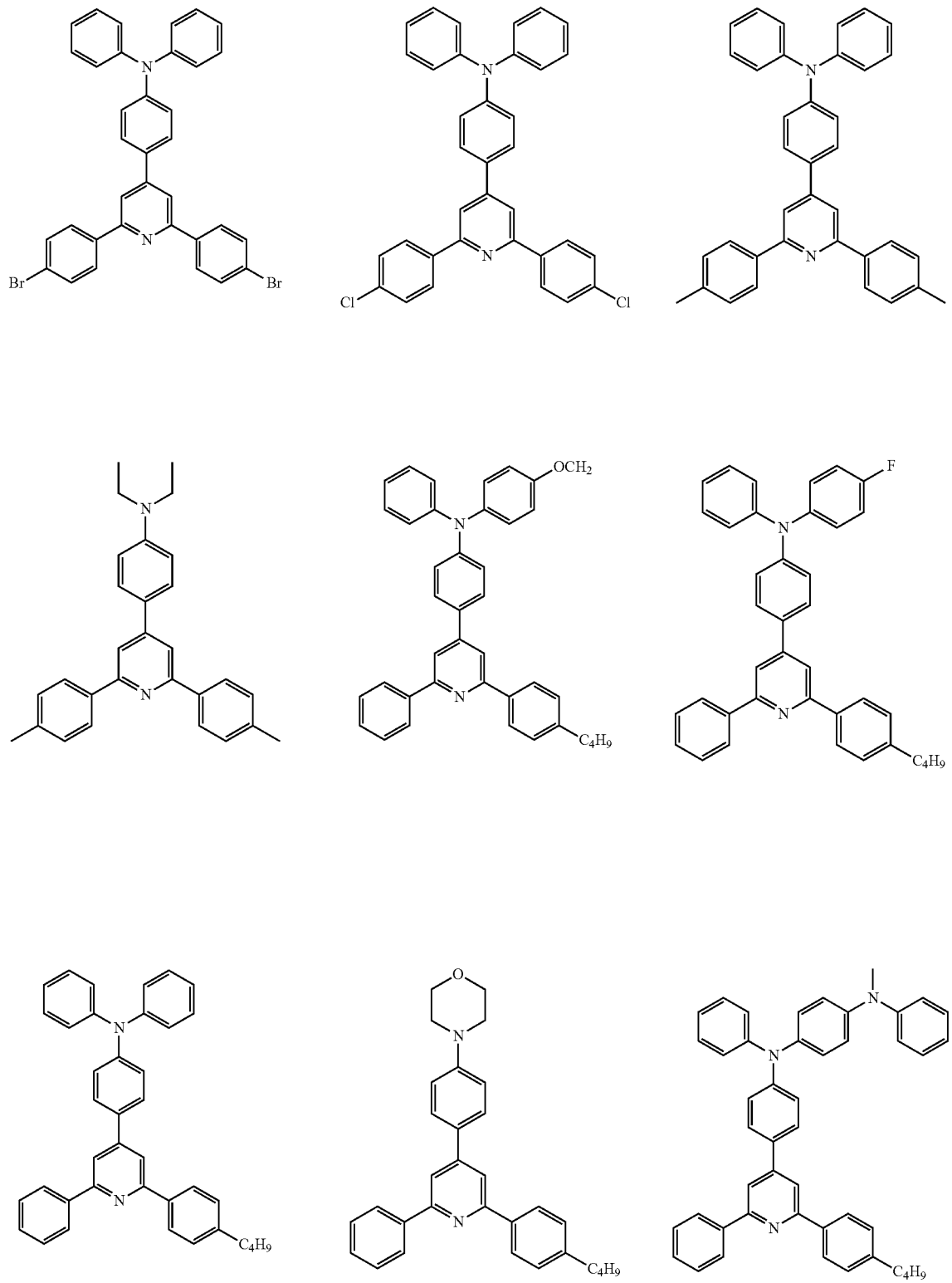

All the inks made from the dye derivatives listed above share a common major issue. All lack light stability, both under UV and indoor fluorescent light. However, all the inks made from these dyes lack suitable light stability. They lasted less than half hour under QSUN testing.

Ciba-Geigy disclosed (U.S. Pat. No. 4,480,096) another class of thermochromic dyes called quizazolines, however, there is no commercial availability for this class. Therefore, the following dyes have been synthesized and tested. See Table 4 on the following page:

TABLE 4
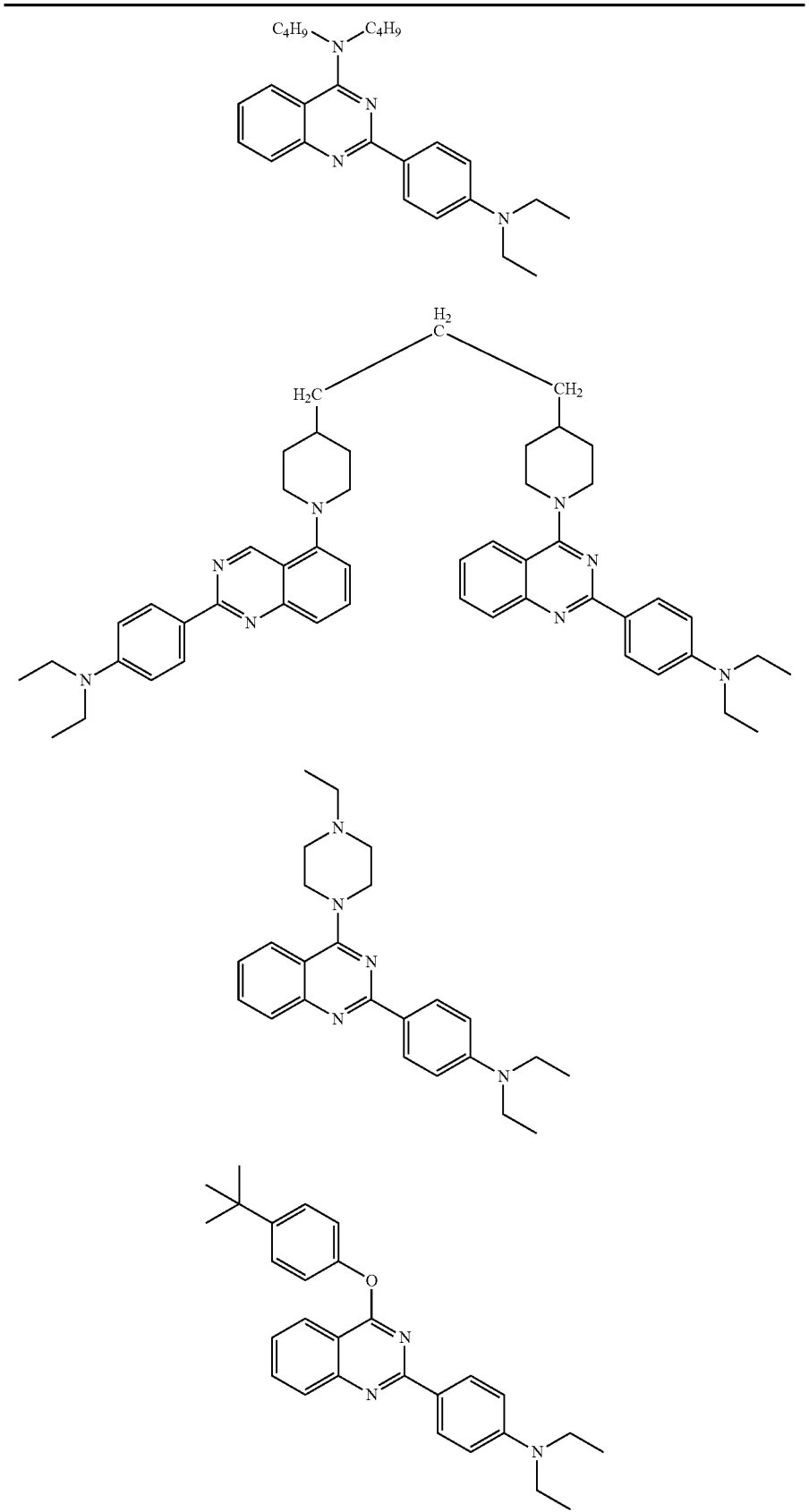

TABLE 4-continued

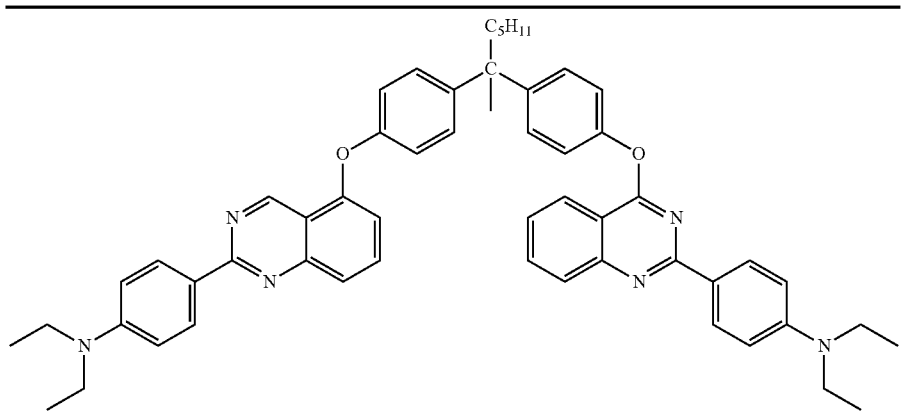

JP 01025148 disclosed the following phthalide-type color formers that can provide yellow thermochromic properties for their photopolymerizable photoduplication application. However, these dyes either cannot be microencapsulated or are thermally unstable even if it can be microencapsulated.

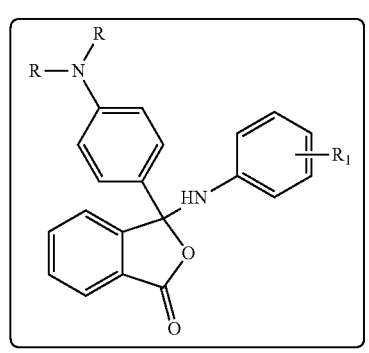

The following dyes have been synthesized (Table 5) and tested:

TABLE 5

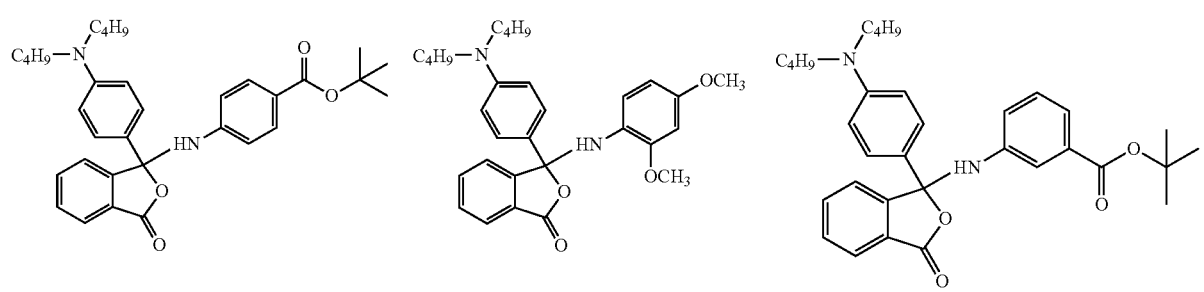

TABLE 5-continued

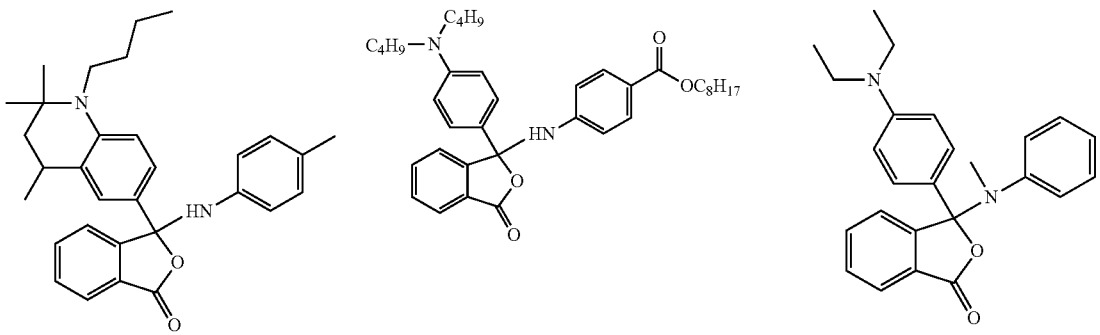

Another subclass of phthalide-type color formers has the following general structure as disclosed by JP 71-04616. Even though these dyes give intense yellow color on TLC, they tends to decompose readily on standing in the air:

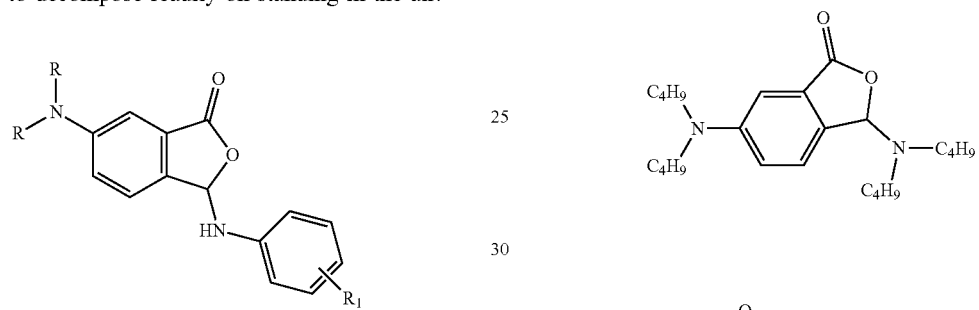

The following dyes have been synthesized (Table 6) and tested:

TABLE 6

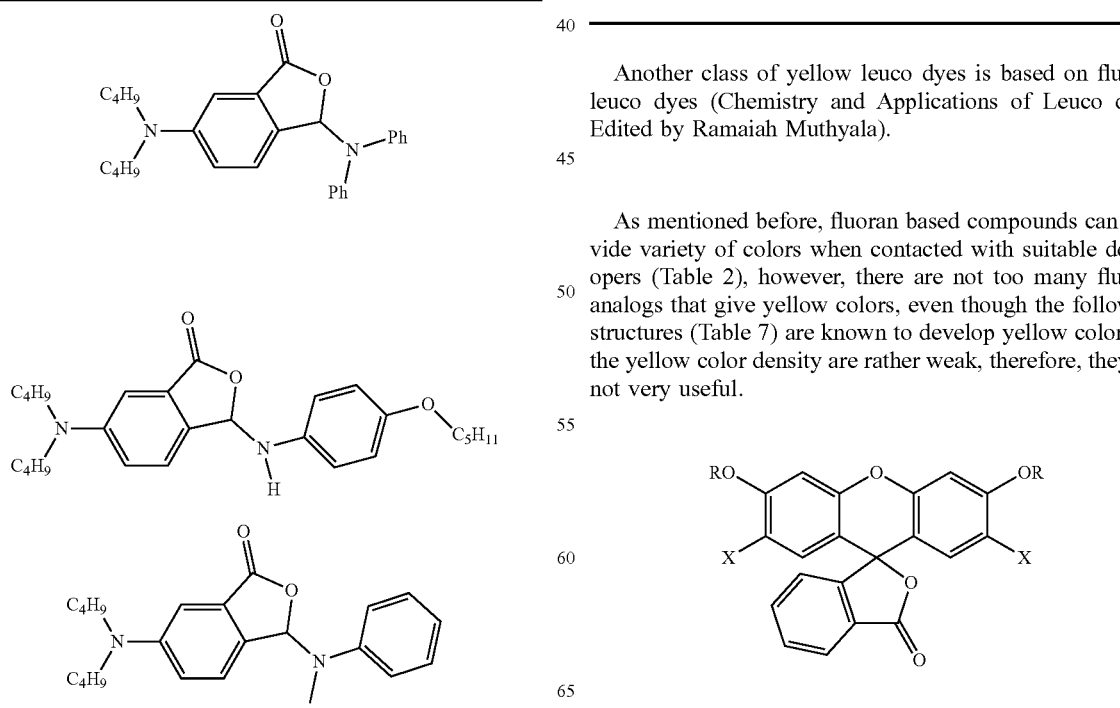

TABLE 6-continued

Another class of yellow leuco dyes is based on fluoran leuco dyes (Chemistry and Applications of Leuco dyes. Edited by Ramaiah Muthyala).

As mentioned before, fluoran based compounds can provide variety of colors when contacted with suitable developers (Table 2), however, there are not too many fluoran analogs that give yellow colors, even though the following structures (Table 7) are known to develop yellow color, yet the yellow color density are rather weak, therefore, they are not very useful.

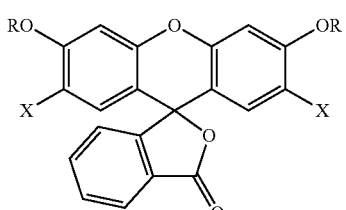

TABLE 7
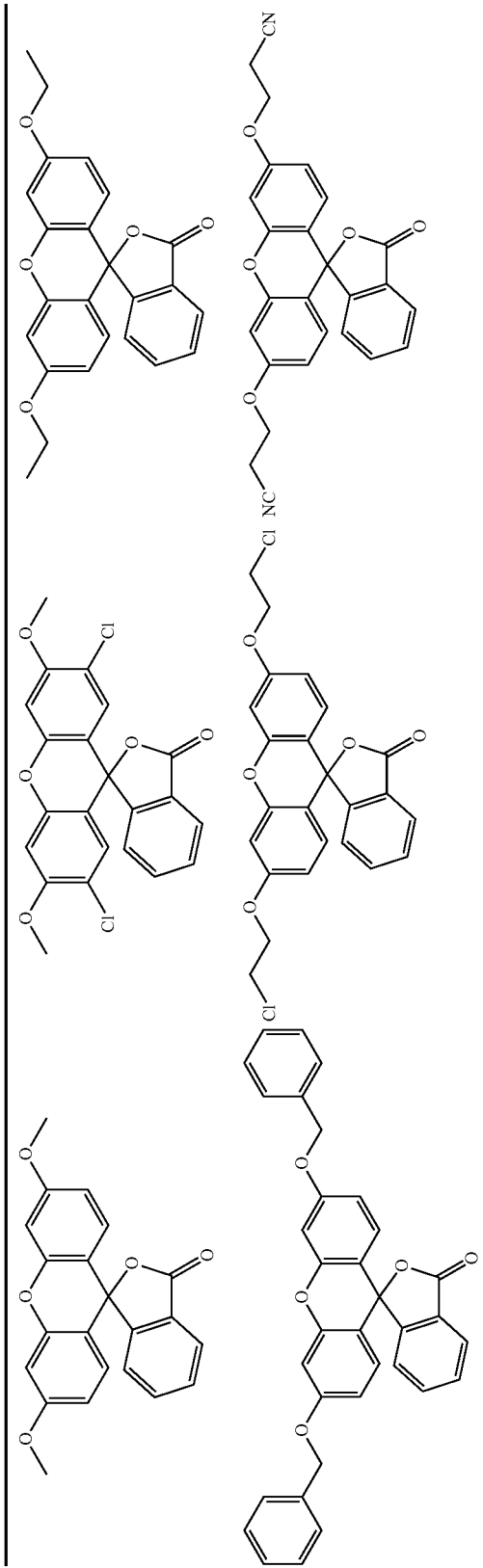

Japanese Patent JP2003186242 from TOSHIBA CORP & YAMADA CHEM CO LTD disclosed the following dye class that is reported to develop yellow color with suitable developers:

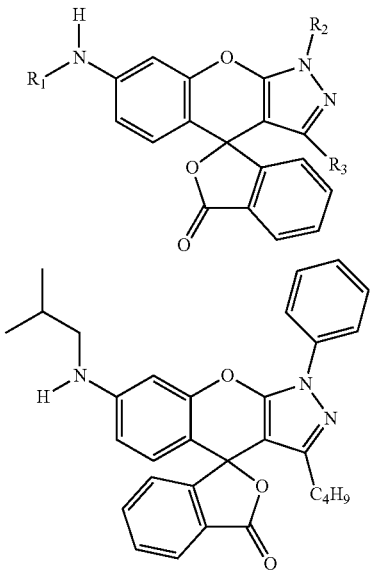

One dye shown above was synthesized to test in our ink system, it turned out that the dye does provide a yellow color, but the color density is weak, probably due to the weaker electron donating ability of mono-alkyamine functional group.

U.S. Pat. No. 3,617,335, filed by Fuji Film on Nov. 2, 1971 for pressure-sensitive copying paper disclosed the following dye chromophores that provide yellowish orange color.

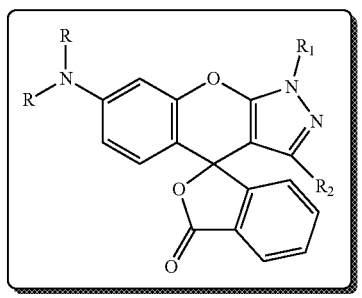

This dye demonstrates suitable light and thermal stability. The inks survive 230C°/3 min of baking, and can also last for 2.5 hours under Qsun. With certain stabilizers (Tinuvin 123), they can last for more than 5 h under Qsun. Even though the color is less idea than a primary yellow color, it has all other desired properties outline above.

SUMMARY

The presently disclosed instrumentalities overcome the problems outlined above and advance the art by providing commercially viable yellow thermochromic dye chromophores, together with ink and pigment utilizing the same. This yellow ink composition is important not only for yellow color production, but also important as one of primary color to secondary and tertiary colors when used together as a blend with known red and blue color formers.

In one aspect, novel dye compositions involve novel yellow dye chromophores, which are used in combination with preferred developers including derivatives of acidic mono phenols, bis-phenol derivatives, derivatives of catechols, or gallates. The yellow inks can be used alone on cans as beer or other beverage temperature indicator; or can be used together with other colored inks.

A general formula for the molecular structure of the yellow dye is set forth below:

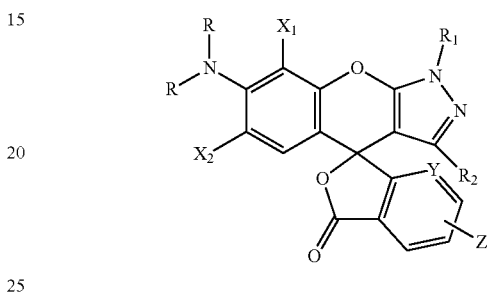

Yellow Dye Chromophore I

Where $X_1$ and $X_2$ can be independently hydrogen, halogen, substituted or non-substituted alkyl, aryl groups, substituted or non-substituted alky ethers or aryl ethers, and mono or bis-alkyl amine or aryl amine, substituted alkyl thio or aryl thio groups.

Y can be carbon or nitrogen.

Z can be hydrogen, halogen, or other simple alkyl substituents.

R, $R_1$ and $R_2$ can be the same or different, they can be independently selected from hydrogen, substituted or non-substituted alkyl or aryl groups, the alky groups can be joined to form a separate ring structures or a fused ring structure with the fluoran skeleton.

DETAILED DESCRIPTION

Figure 1:
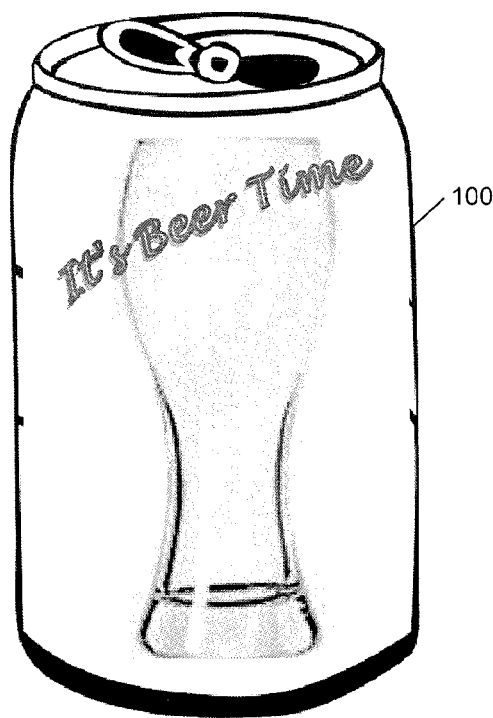
FIG. 1 shows an aluminum can that has been printed using a metal-deco ink produced according to the instrumentalities herein and demonstrating a color off-state.

The yellow thermochromic dyes are synthesized based on the general synthetic scheme below:

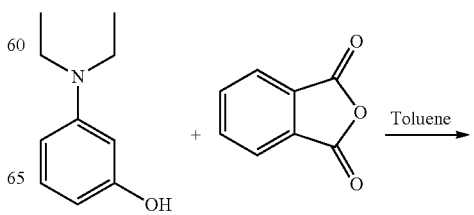

-continued

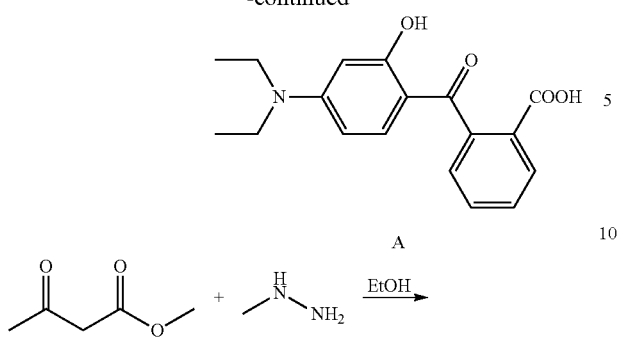

A

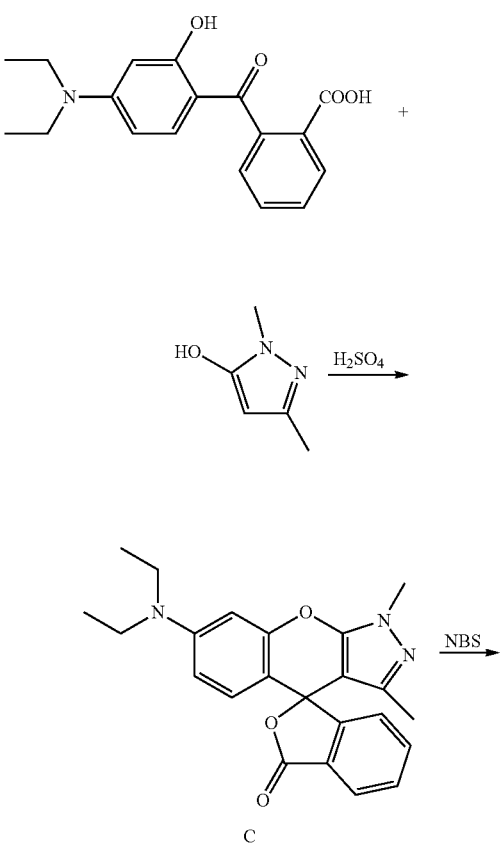

-continued

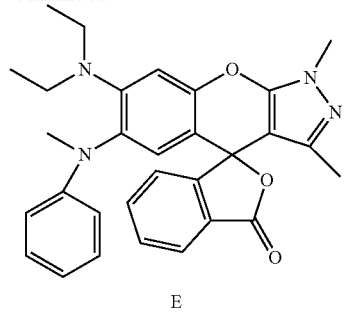

E

Synthesis

A mixture of 3-diethyl aminophenol (165 g, 1 mol) and phthalic anhydride (148 g, 1 mol) in toluene (400 ml) was refluxed overnight, it was then cooled to RT and the solid material was collected by filtration and washed with cold methanol and air dried, product A was obtained as light purplish powder, 250 gram, ~80% yield.

To a mixture of methyl acetoacetate (70 g, 0.6 mol) in ethanol (500 ml) in a round bottom flask was added drop wise methyl hydrazine (27.6 g, 0.6 mol) with an ice-water bath to keep the temperature below 40° C. The resulting mixture was then stirred at RT for overnight. The solvent was then removed under rotary evaporator to dryness, the solid product was further dried under vacuum, an off-white solid product B (66 grams) was obtained, and used without further purification in next dye formation step.

To a mixture of B (56 g, 0.5 mol) dissolved in concentrated $H_2SO_4$ (800 g) was added compound A (157 g, 0.5 mol) with stirring. The resulting mixture was then heated at 50-60° C. for overnight with stirring. It was then cooled to RT, and poured to 2 liter of ice-water with stirring, then 48% NaOH aqueous solution was added slowly to adjust the PH to ~4. The orange color solid was formed and collected by vacuum filtration and washed with cold water. The solid was air-dried, and then suspended in a mixture of toluene (1 liter) and 5% NaOH (800 ml) and heated to reflux for 30 minutes. The toluene layer was then collected, the aqueous layer was extracted with more toluene (300 ml), the combined toluene layers were combined, and concentrated to dryness. The residue was redissoved in methanol (400 ml) and refluxed for 30 min, and cooled in an ice bath, the reaction product was precipitated out, and it was collected by filtration and washed with cold methanol. A white solid product C 136 gram was obtained, ~70% yield.

To a mixture of C (7.8 g, 20 mmol) dissolved in $CH_3CN$ (100 ml) was added $NH_4OAc$ (154 mg, 10% mol), the resulting mixture was cooled in an ice-water bath, then NBS (3.7 g, 20 mmol) was added in portions, then the mixture was warmed up to room temperature and the reaction was monitored by TLC. The solvent was then removed under rotavapour, and the residue was purified through a silica gel column eluted with a mixture of hexane and ethyl acetate, 4.5 g solid product D was obtained.

To a mixture of dye D (2.0 g, 4.3 mmol) dissolved in toluene under nitrogen was added sodium t-butoxide (0.5 g), palladium acetate (43 mg), and tri-t-butylphosphite (drops), the resulting mixture was heated to reflux and monitored by TLC. The solvent was then removed and the residue was purified through a silica gel column eluted with a mixture of hexane and ethyl acetate, 0.5 g solid product E was obtained.

With the general scheme and common intermediates described above, the following dyes have also synthesized and listed in Table 8 below:

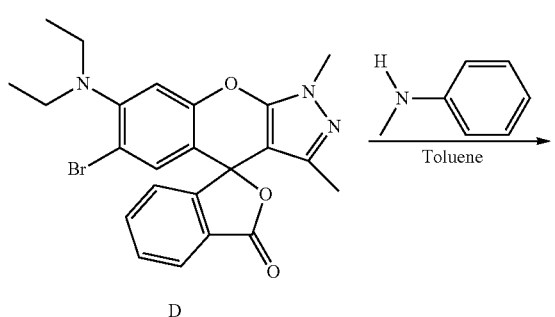

D

TABLE 8
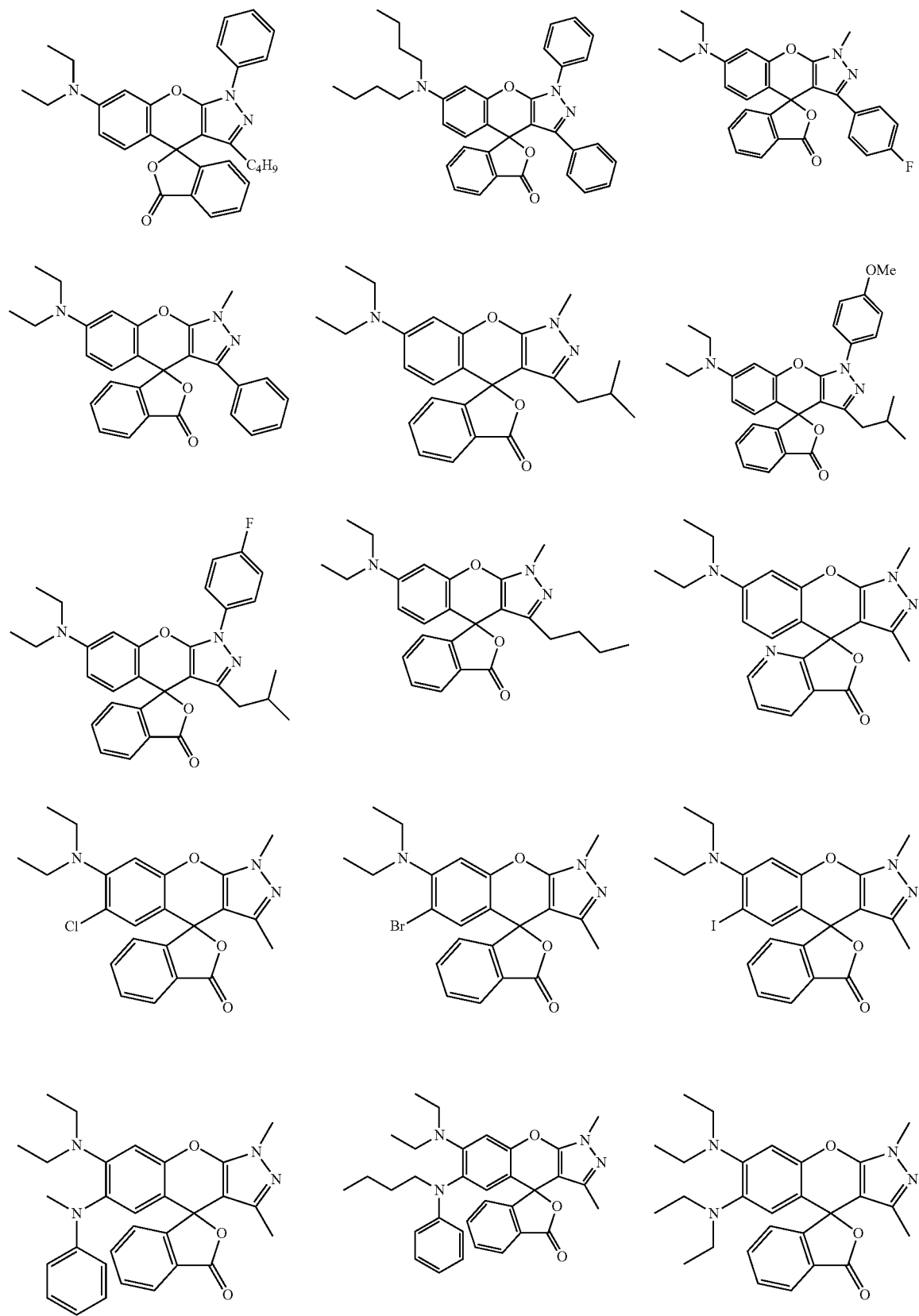

TABLE 8-continued

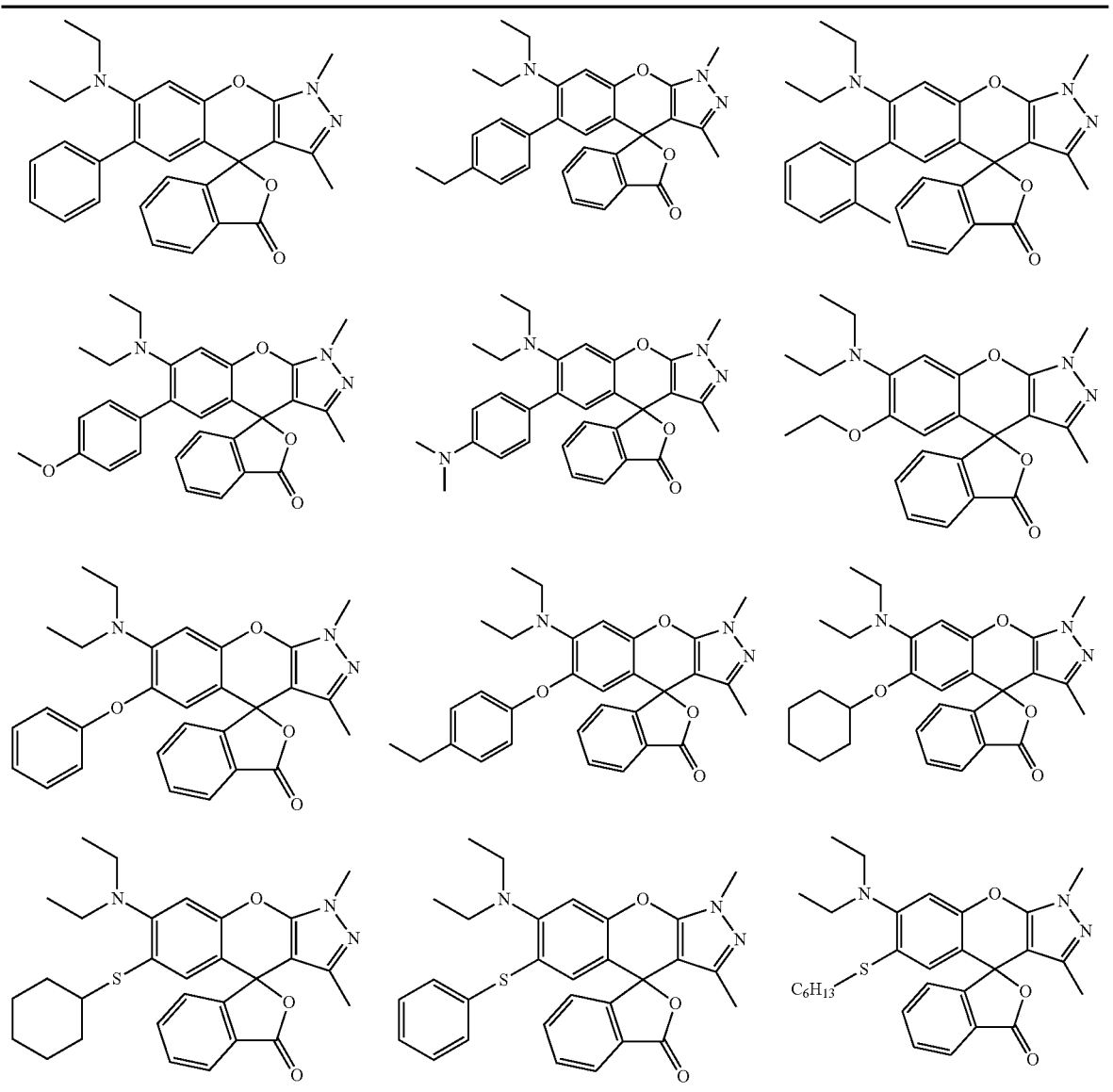

The developers such as derivatives of catechol, gallate and bis-phenol are particularly preferred for use with these leuco dyes to create good yellow images. Specifically, these leuco dyes mixed with specific developers mentioned above are dissolved in fatty esters such as methyl palmitate, isopropyl palmitate, methyl stearate, stearyl behenate, or alcohols such as myristyl alcohol, behenyl alcohol, tetradecanol, or amides such as stearamide, stearylstearamide, or mixtures of such fatty esters, alcohols, or amides at 90° C. to 140° C. The resulting liquid is then dispersed by addition to a dispersing polymer such as ethylene maleic acid dissolved in distilled water at 2.72 wt % and neutralized to pH 3.95 by addition of triethanolamine, at 75° C. under high shear in a homogenizer with rotor-stator speed at 9900 rpm for 0.5 to 4 minutes. Melamine formaldehyde resin is then added and the oil dispersion is encapsulated at high shear for 30 to 90 seconds and then stirred at 65-75° C. for 2 hours to complete the cross-linking reaction. The aqueous pigment slurry produced by this process has particle sizes less than 5 microns and when drawn-down on ink test paper and dried, the pigment coating shows reversible thermochromic properties when cooled to the solidification point of the fatty ester, alcohol, amide, or a blend designed to obtain a specific temperature for full color formation. Such pigments can be designed to have a range of temperature for transition from full absorption temperature (full absorption color or UVA absorption point) to no color or no UVA absorption temperature (clearing point) of 2-7° C. The pigments are very useful for manufacture of ink, coating, and injected molded plastic products by first drying in a steam kettle or via spray drying prior to formulation into inks or coating compositions or extrusion into thermoplastic polymers to produce pellet concentrates for manufacture of injection molded thermochromic plastic products such as cups, cup lids, jars, straws, stirrers, container sleeves, shrink-wrap labels. For example, thermochromic compositions were identified that permit generation of high quality saturated photographic quality yellow color that not only is very desirable for beer indicator, but is also very useful to formulate with other two primary color, blue and red inks to make all other new secondary colors inks such as orange, brown, and green colors by mixing.

As an example, an emulsion mixture used to form the microcapsules may be formulated as premixtures in three parts described below:

Part I, an aqueous solution that contains water and optionally other polar solvents that are miscible with water constitutes an aqueous phase of the emulsion. Water is the preferred solvent. This is mixed to substantial homogeneity with a surfactant material that is used as an emulsifier or emulsion stabilizer. The emulsifier may suitably include, for example, nonionic, anionic, cationic, or zwitterionic surfactants, polymers or copolymers, or reactive diluents such as aliphatic or cycloaliphatic glycidyl ethers. Nonionic surfactants are preferred. Anhydrides are particularly preferred, especially those such as ethylene maleic anhydride, derivatives thereof and copolymers of ethylene maleic anhydride which may be pH adjusted using an amine, such as triethanolamine. For example, one useful surfactant material is hydrolyzed ethylene maleic anhydride adjusted to a pH of around 4.0 with triethnolamine.

Part II, an internal phase mixture constitutes any of the internal phase materials described below and is generally insoluble with the aqueous phase. These materials are combined to form thermochromic systems using ratios and as are known in the art. Although there may be additional additives as described below, the essential internal phase components include a leuco dye, a developer for the leuco dye, and a carrier such as a microcrystalline wax which may alternatively be an ester and/or alcohol.

Part III, an amine-formaldehyde resin solution. This is preferably of the class known as having high amine content, as this increases solubility of the resin in water. One example of a suitable amine formaldehyde resin is Cymel 385. This is mixed with water or another compatible polar solvent, preferably in an amount where the water ranges from 40% to 60% of the amine formaldehyde resin solution.

The foregoing pre-mixtures are maintained at respective temperature profiles to facilitate further mixing under conditions of high shear mixing. The aqueous solution is maintained at a temperature ranging from 75-85° C. For example, this may be done in a reaction vessel that is jacketed for temperature control. The amine-formaldehyde resin solution is maintained at a temperature ranging from 22° C. to 50° C. The internal phase mixture including leuco dye, developer, and carrier is maintained at a temperature of 120° C. to 140° C., or another temperature as may be required as is sufficient to liquefy the carrier.

In a preferred mixing order, the internal phase solution is poured into the aqueous solution under high shear conditions created by a homogenizer, such as a rotor/stator that is submerged in the emulsifier solution. The entire volume of the internal phase is introduced under a controlled timed pour. The high shear homogenizer runs until the internal phase produces an oil-in-water emulsion that facilitates particle sizes of the desired distribution. Once the emulsion is generated, the amine-formaldehyde solution (Part II) is poured under a controlled time condition while the homogenizer rapidly disperses the wall forming pre-polymer. At the end of the resin addition, the homogenizer is removed from the process. A large impeller type mixer is then engaged in the slurry to keep the capsules suspended while the capsule walls form. The encapsulation process is complete after 2-8 hours at the temperature that ranges from 80° C. to 90° C.

While the capsule wall starts forming and hardening under the impeller mixing, a catalyst for polymerizing the resin may be introduced. The resin may be combined with one or more known catalysts to initiate polymerization. Certain curing agents may be added to facilitate the curing rate of the amine formaldehyde resin without permanently activating the thermochromic system.

Suitable cure accelerators or catalysts include, but are not limited to, imidazoles, amidoamines, linear phenolics, blocked and unblocked acid catalysts, isocyanates, dihydrazides or photoinitiators and dodecylbenzenesulfonic acid. In one preferred embodiment, the curing agent is dodecylbenzenesulfonic acid. Suitable curing agents include at least the following acid catalyst curing agents, for example: A 40S; ABS 100; Ambicat LE 4476; B 121; B 121 (surfactant); Bio-Soft S 100; Bio-Soft S 101; Biosoft S 126; Calsoft LAS 99; Cat 6000; Catalyst 600; Catalyst 6000; Cycat 600; DBS; Dobanic acid; Dodecylbenzenesulphonic acid; E 7256; Elfan WA Sulphonic Acid; LAS 99; laurylbenzenesulfonic acid; Lipon LH 500; Maranil DBS; Marlon AS 3; Nacconol 98SA; Nacure 5074; Nacure 5076; Nansa 1042; Nansa 1042P; Nansa SSA; Neopelex FS; Neopelex GS; Neopelex GS-P; P 3 Vetralat; Pelex F 25; Polystep A 13; Rhodacal SSA/A; Richonic Acid B; S 100; Soft Osen 5S; Sulfosoft; Sulframin 1298; Sulframin Acid 1298; Taycacure AC 430; Taycapower L 120D; Taycapower L 121; Taycapower L 122; Ufacid K; Witco 1298; Witco 1298 Acid Soft; Witco 1298 Soft Acid; Witconic 1298 Hard Acid; Witconic 1298 Soft Acid; blocked or unblocked acid catalysts; Decotherm 255e, Nacure 2500, cycat 4040, cycat 4045, cycat 600, paratoluene sulfonic acid, amine blocked paratoluenesulfonic acid; and n-dodecylbenzenesulfonic acid. For small microcapsulres, p-toluene sulfonic acid catalysts are particularly preferred, and amine-blocked p-toluene sulfonic acid catalysts are especially preferred.

In the case of a toluene sulfonic acid catalyst, this is added at 5% to 30% by weight of the amine formaldehyde resin. The pH is adjusted to about 4 by addition of an amine, such as triethanolamine. Under the high temperature and low pH, the amine formaldehyde resin will polymerize and accumulate as the capsule wall around the internal phase. The resin wall will further cross-link into a hardened shell over a period of 2-8 hours while the polymerization reaction maintains at a temperature from 80° C. to 90° C. The use of an amine blocked toluene sulfonic acid, such as Cycat 4045™, enhances the capsule wall density making the microcapsules more chemically resistant.

After polymerization, the slurry will have a high kinematic viscosity ranging from 2000 to 4000 centipoise. The slurry is approximately 40% by weight solids including capsules and other materials, together with approximately 60% water. In order to produce a metal decoration ink, the bulk of the water needs to be removed from the liquid slurry, thus reducing the amount of water from 60% by weight percentage to a percentage of from 20%-40% by weight.

The dewatering process is accomplished by filtering the slurry under pressure using a mesh filter. This can be accomplished by positive pressure or under vacuum. The dewatered slurry will form a clay-like cake on the surface of the filtering material. In order to filter the slurry, a solution of [alum] ammonium aluminum sulfate (1-10% concentration) will be added to the slurry from 20-100% by weight of the slurry to neutralize the zeta potential or charges outside capsule walls which help capsules disperse in the slurry. The addition of Alum solution leads to the aggregation of the capsules and help filtration process without blocking the pores in the filter membrane.

Further dewatering may be accomplished by introducing the filtered slurry into a jacketed vacuum mixer which will maintain the temperature from 100-200 F for a period of 2-10 hours under a high vacuum condition. During the vacuum drying process, the slurry is continuously mixed to expose surface area to accelerate the drying process. The slurry will be dewatered to a concentration of 20-40% moisture. This final clay-like press cake slurry will then be suitable for processing into a metal decorating ink that can withstand a high temperature oven cure without significant color loss, and will also have improved transfer rheology without severe misting.

Specific Ink Formulations

The ink formulation used for metal decoration is based on the formula below (Table 9):

TABLE 9

| Ingredient | Weight % |
| --- | --- |
| Thermochromic Pigment-yellow | 37.5% |
| Decotherm 290E | 28% |
| Cymel 303 | 8.5% |
| D/C/E | 6% |
| Lovoc White | 5% |
| Butyl carbitol acetate | 4.5% |
| Tinuvin400 | 4% |
| Surfynol420 | 2.5% |
| Claytone | 2% |
| Cycat 4045 | 1% |
| Surfynol 104PA | 1% |
| Total | 100% |

Example 1

Production of Melamine Resin Membrane Microcapsules (In Situ Polymerization Method)

An emulsion mixture was prepared from premixtures as described above including: (1) an aqueous emulsifier solution, (2) an internal phase mixture, and (3) an amine formaldehyde resin.

The aqueous emulsifier solution was prepared by hydrolyzing 27.2 g of ethylene maleic anhydride copolymer (ZeMac® E400 from Vertellus®) in 455.8 g water. The pH of the solution was adjusted to 4 by the addition of 17 g triethanolamine. The resulting aqueous emulsifier solution was maintained at a temperature ranging from 75° C. to 85° C. The aqueous solution weighed 500 g, constituting 43.8% of the emulsion mixture by weight.

The internal phase mixture was a mixture for producing a yellow thermochromic effect and included 68% by weight of methyl palmitate as the carrier, 8% by weight of dye 1, and 24% by weight of 3,5-di-tert-butyl catechol as the developer. The internal phase mixture weighed 300 g, constituting 26.3% of the emulsion mixture by weight. The internal phase mixture was maintained at a temperature ranging from 120° C. to 130° C.

The amine-formaldehyde resin solution was prepared by mixing 104.6 g of a commercial high amino anime formaldehyde product (Cymel 385 from Cytec), with 95.4 g of water. The amine formaldehyde solution weighed 200 g, constituting 17.5% of the emulsion mixture.

The internal phase solution was poured into the aqueous solution under high shear condition created by a high shear homogenizer at 10,000 rpm over 1 minute. After a stabilized emulsion was achieved, the amine-formaldehyde resin solution was poured into the emulsion over 30 seconds. The resulting mixture was then homogenized for an additional 45 seconds before the homogenizer was shut down and removed from the system. The mixture continued to be mixed under an overhead impeller mixer for 2 hours while maintaining at temperature that ranged from 80° C. to 90° C.

An aqueous solution of catalyst (20.9 g Cycat 4045 from Cytec) that facilitates the polymerization of the resin was then added to the above mixture. The catalyst solution weighed 141.8 g, constituting 12.4% of the emulsion mixture. The pH of the resulting mixture was adjusted to about 4 by the addition of triethanolamine. Under the high temperature and low pH, the amine formaldehyde resin polymerized and accumulated as the capsule wall around the internal phase.

Example 2

Production of Melamine Resin Membrane Microcapsules (In Situ Polymerization Method)

The internal phase mixture was a mixture for producing a yellow thermochromic effect and included 72% by weight of the mixture of butyl palmitate and behenyl alcohol (85/15, w/w) as the carrier, 8% by weight Dye 1, and 20% by weight of 4,4'-(2-ethylhexylidene)diphenol as the developer. With the exception of using this encapsulation internal phase, a microcapsule slurry was prepared in the same manner as the EXAMPLE 1.

Figure 2:
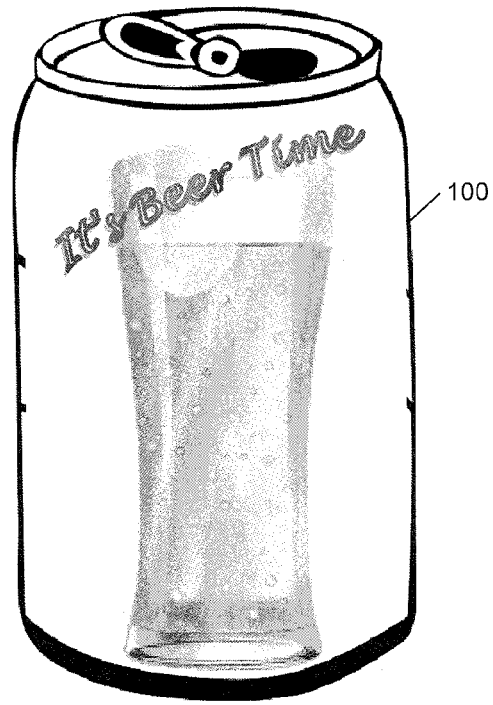
FIG. 2 shows the aluminum can in a color-on state.

FIGS. 1 and 2 each show an aluminum can 100 printed with inks made in Examples 1 and 2: FIG. 1 shows the off-state when warm. FIG. 2 shows an on-state when cold. The cans may alternatively be printed with inks from Examples 1 and 2.

The color stabilities both under UV and fluorescence light are compared between the inks made from the dyes disclosed herein versus dyes disclosed in the prior art. The results are listed below (Table 10):

TABLE 10

| Dye | UV Stability (QSUN) (hour) | Fluorescence Stability (hour) |
| --- | --- | --- |
|  | 0.25 | 23 |

TABLE 10-continued
| Dye | UV Stability (QSUN) (hour) | Fluorescence Stability (hour) |
|---|---|---|
| 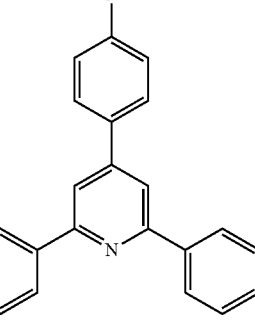 | 0.5 | 24 |
| 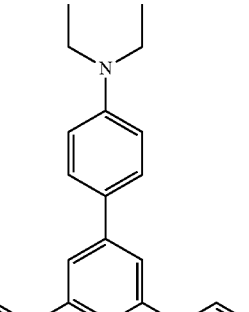 with stabilizer IRG1010 | 0.5 | 69 |
| 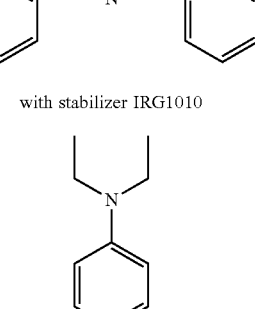 | 0.25 | 175 |
| 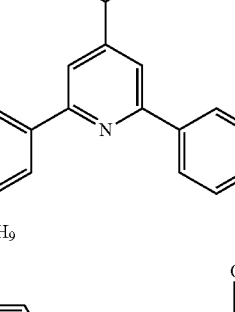 | Cannot be microencapsulated | x |

TABLE 10-continued

| Dye | UV Stability (QSUN) (hour) | Fluorescence Stability (hour) |
|---|---|---|
| [structure] | The ink thermally unstable | x |
| [structure] | 4 But the yellow color density is weak | x |
| [structure] | <0.5 | x |
| [structure] | The dye itself unstable | x |

TABLE 10-continued

| Dye | UV Stability (QSUN) (hour) | Fluorescence Stability (hour) |
|---|---|---|
| 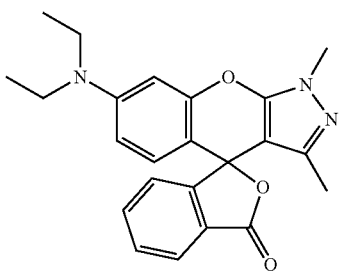 [SMILES: CCN(CC)c1ccc2c(c1)Oc1c(c(C)nn1C)C21OC(=O)c2ccccc21] with developer 4,4'-(2-ethylhexylidene)diphenol | 4 | 192 |
| 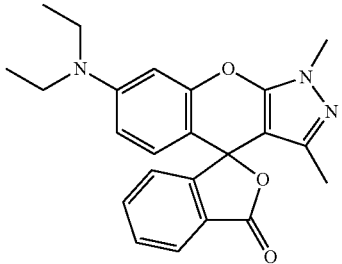 [SMILES: CCN(CC)c1ccc2c(c1)Oc1c(c(C)nn1C)C21OC(=O)c2ccccc21] with developer 3,5-di-tert-butyl catechol | 5 | 240 |

X-not measured.

We claim:

1. A yellow thermochromic ink comprising:
a yellow thermochromic dye encapsulated within a microcapsule;
a polyester polymer;
a crosslinker which crosslinks said polyester polymer; and
a catalyst which accelerates crosslinking of said polyester polymer.

2. The yellow thermochromic ink of claim 1, wherein said crosslinker comprises a melamine crosslinker.

3. The yellow thermochromic ink of claim 2, wherein said crosslinker comprises a monomeric melamine crosslinker.

4. The yellow thermochromic ink of claim 1, wherein said catalyst comprises an acid catalyst.

5. The yellow thermochromic ink of claim 4, wherein said acid catalyst comprises an amine blocked acid catalyst.

6. The yellow thermochromic ink of claim 5, wherein said amine blocked acid catalyst comprises an amine blocked para-toluene sulfonic acid catalyst.

7. The yellow thermochromic ink of claim 1, wherein said microcapsule has an average diameter of less than about 3 microns.

8. The yellow thermochromic ink of claim 1, wherein said microcapsule has an average diameter of less than about 1.6 microns.

9. The yellow thermochromic ink of claim 1, wherein said yellow thermochromic dye is ultraviolet light stable for greater than about 30 minutes.

10. The yellow thermochromic ink of claim 1, wherein said yellow thermochromic dye is ultraviolet light stable for not less than about 4 hours.

11. The yellow thermochromic ink of claim 1, wherein said yellow thermochromic dye is fluorescent light stable for greater than about 175 hours.

12. The yellow thermochromic ink of claim 1, wherein said yellow thermochromic dye is fluorescent light stable for not less than about 192 hours.

13. The yellow thermochromic ink of claim 1, wherein:
said yellow thermochromic dye is ultraviolet light stable for greater than about 30 minutes; and
said yellow thermochromic dye is fluorescent light stable for greater than about 175 hours.

14. The yellow thermochromic ink of claim 1, wherein:
said yellow thermochromic dye is ultraviolet light stable for not less than about 4 hours; and
said yellow thermochromic dye is fluorescent light stable for not less than about 192 hours.

15. The yellow thermochromic ink of claim 1, wherein said yellow thermochromic ink is formulated as a metal decoration ink.

16. The yellow thermochromic ink of claim 15, wherein said metal decoration ink is formulated for use on cans.

17. The yellow thermochromic ink of claim 16, wherein said cans comprise aluminum.

18. The yellow thermochromic ink of claim 1, wherein said yellow thermochromic dye has the following formula:

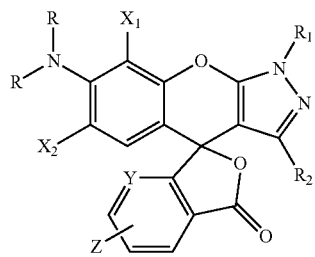

wherein:
- $X_1$ and $X_2$ are independently selected from hydrogen, halogen, alkyl, aryl, alkyl ether, aryl ether, mono-alkyl amine, bis-alkyl amine, aryl amine, alkyl thio, and aryl thio;
- Y is independently selected from carbon or nitrogen;
- Z is independently selected from hydrogen, halogen, and alkyl;
- R is independently selected from alkyl and aryl; and
- $R_1$ and $R_2$ are independently selected from hydrogen, alkyl, and aryl.

19. The yellow thermochromic ink of claim 18, further comprising:
- a developer comprising a catechol having at least two ring substituents which are alkyl;
- wherein said yellow thermochromic dye and said developer are encapsulated within said microcapsule.

20. A yellow thermochromic ink comprising:
- a yellow thermochromic dye;
- a developer comprising a bisphenol;
- wherein said yellow thermochromic dye and said developer are encapsulated within a microcapsule;
- a polyester polymer;
- a crosslinker which crosslinks said polyester polymer; and
- a catalyst which accelerates crosslinking of said polyester polymer.

* * * * *